US007647041B2

(12) United States Patent
Gonsalves et al.

(10) Patent No.: US 7,647,041 B2
(45) Date of Patent: Jan. 12, 2010

(54) SYSTEMS, METHODS, AND APPARATUS TO ENABLE BACKUP WIRELESS DEVICES

(75) Inventors: Brian Gonsalves, Concord, CA (US); Kent Perkins, Antioch, CA (US); Sheri Pena, Martinez, CA (US); Zesen Chen, Pleasanton, CA (US); Peter Chou, San Ramon, CA (US)

(73) Assignee: SBC Knowledge Ventures, L.P., Reno, NV (US)

( * ) Notice: Subject to any disclaimer, the term of this patent is extended or adjusted under 35 U.S.C. 154(b) by 364 days.

(21) Appl. No.: 11/393,113

(22) Filed: Mar. 30, 2006

(65) Prior Publication Data

US 2007/0232272 A1 Oct. 4, 2007

(51) Int. Cl.
*H04M 3/00* (2006.01)
(52) U.S. Cl. ............... 455/420; 455/418; 455/427; 455/456.1; 370/328; 370/338
(58) Field of Classification Search .......... 445/420, 445/418, 456.1, 427; 370/328, 338
See application file for complete search history.

(56) References Cited

U.S. PATENT DOCUMENTS

| | | | |
|---|---|---|---|
| 6,320,843 B1 | 11/2001 | Rydbeck et al. | |
| 6,484,033 B2 | 11/2002 | Murray | |
| 6,771,761 B1 | 8/2004 | LaPierre | |
| 6,807,417 B2 | 10/2004 | Sallinen et al. | |
| 6,901,260 B1 | 5/2005 | Xin | |
| 6,912,384 B2 | 6/2005 | Huomo et al. | |
| 6,965,773 B2 | 11/2005 | Basson et al. | |
| 7,190,969 B1 * | 3/2007 | Oh et al. | 455/551 |
| 7,376,429 B2 * | 5/2008 | Choukroun et al. | 455/456.1 |
| 2002/0151302 A1 | 10/2002 | Schmidt et al. | |
| 2008/0155215 A1 * | 6/2008 | Matsuzaki et al. | 711/162 |

OTHER PUBLICATIONS

"How Cell Phones Work", by Julie Layton, Marshall Brain & Jeff Tyson, 17 pages.
International Searching Authority, International Search Report for PCT/US07/05191, Sep. 9, 2008, 3 pages.
International Bureau, International Preliminary Report on Patentability and Written Opinion for PCT/US2007/005191, Sep. 9, 2008, 4 pages.

* cited by examiner

*Primary Examiner*—Nghi H Ly
(74) *Attorney, Agent, or Firm*—Hanley, Flight & Zimmerman, LLC

(57) ABSTRACT

Systems, methods, and apparatus are disclosed to enable backup wireless devices. An example method disclosed herein includes receiving a first activation code from a first wireless device, comparing the first activation code associated with the first wireless device with a first activation code in a database, activating the first wireless device when the first activation code associated with the first wireless device matches the first activation code in the database, and when a second wireless device is active, deactivating the second wireless device in response to receipt of the first activation code associated with the first wireless device.

49 Claims, 7 Drawing Sheets

| USER | EID | MIN | ACTIVATION CODE | STATUS |
|---|---|---|---|---|
| BOB SMITH (Acct. # 1234) | 25A | 555-555-1212 | 101671 | ACTIVE |
| BOB SMITH (Acct. # 1234) | 3B4 | 555-555-1212 | 081772 | STAND BY |
| JANE DOE (Acct. # 4321) | A4F | 555-740-1944 | 111802 | ACTIVE |
| JANE DOE (Acct. # 4321) | 17C | 555-740-1944 | 102803 | STAND BY |

FIG. 2

SYSTEMS, METHODS, AND APPARATUS TO ENABLE BACKUP WIRELESS DEVICES

FIELD OF THE DISCLOSURE

This disclosure relates generally to wireless backup telephones, and, more particularly, to systems, methods, and apparatus to enable backup wireless devices.

BACKGROUND

Wireless devices, such as wireless telephones and personal digital assistants (PDAs) provide a great opportunity for person-to-person communication, out-of-office productivity, and personal safety. Most developed and developing areas of the globe include a communication network that enables the use of wireless telephones, PDAs with wireless communication functionality, and/or wireless telephones with PDA functionality.

A wireless device is typically carried by a user at all times during the day, and frequently near the user at night (e.g., on a night-table and/or bed stand). However, sometimes the wireless device becomes separated from the user's possession, either by choice or by accident. For example, a user may know that their wireless device is ineffective or not permitted in various locations, such as commercial airplanes, hospitals, nursing homes, movie theatres, etc. As such, the user may choose to leave the wireless device at home, in a car, in the office, and/or in the luggage and retrieve it later. Alternatively, the user may simply forget that the wireless device was left at home, in the car, in the office, and/or in the luggage, at which time the user decides the wireless device is needed. Worse still, the user may have lost the wireless device, accidentally destroyed the wireless device, or the wireless device may have been stolen. Regardless of the cause of separation, the wireless device is no longer available for use and, if not destroyed, subject to fraudulent use by a thief.

A user that has lost, misplaced, forgotten, or destroyed a wireless device must typically rely on a wireless communication service provider to cancel and deactivate that device. If the user owns an alternate wireless device, such as an inactive older model, the wireless communication service provider may refuse to simply assign the user's account to the alternate device. As a result, the user may be effectively forced into purchasing an alternate wireless device to access services for which they have an active contract. The pressure to purchase another wireless device is particularly evident in view of the strict contractual obligations of the user to the wireless communication service provider, which typically last from one to two years and include an expensive early termination fee. On the other hand, even if the wireless communication service provider permits the alternate wireless device to be associated with the user's account, such an association may be dependent upon a significant service charge.

Regardless of the user's choice, after a wireless communication device has been lost, misplaced, forgotten, destroyed, or stolen, the wireless communication service provider typically assists the user with a remedy. Such reliance upon the wireless communication service provider renders the user at a further disadvantage due to typically long hold-times and/or limited hours of customer service operation. By the time the user finally reaches a customer service representative, much time has elapsed and, particularly in the case of a stolen wireless device, many hundreds of dollars in fraudulent wireless services may have been used.

BRIEF DESCRIPTION OF THE DRAWINGS

FIG. 2 is an example data table of wireless devices for use in the example system of FIG. 1.

DETAILED DESCRIPTION

Systems, methods, and apparatus to enable backup wireless devices are disclosed. An example method includes receiving a first activation code from a first wireless device, comparing the first activation code associated with the first wireless device with a first activation code in a database, activating the first wireless device when the first activation code associated with the first wireless device matches the first activation code in the database, and when a second wireless device is active, deactivating the second wireless device in response to receipt of the first activation code associated with the first wireless device. An example system includes a device database to receive and store wireless device data, a wireless device network to facilitate communication between wireless devices and the device database, and a wireless device server to activate a first wireless device and deactivate a second wireless device in response to a first activation code. An example apparatus includes a first wireless device, the first wireless device including a first input and a first transmitter, and a second wireless device, the second wireless device including a second input and a second transmitter, the first wireless device receiving a first activation code from the first input to activate the first wireless device and deactivate the second wireless device.

Figure 1:
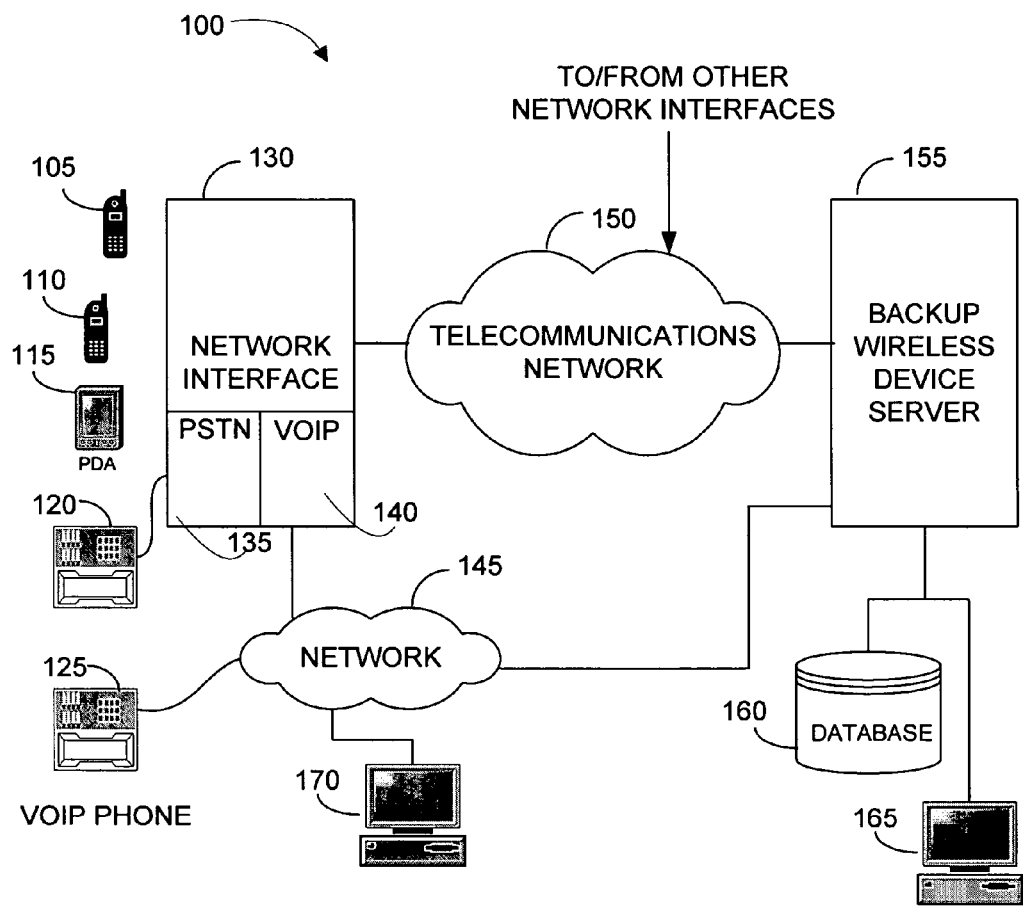
FIG. 1 illustrates an example system for enabling backup wireless devices.

An example system 100 to enable backup wireless devices is shown in FIG. 1. The system 100 includes various communication devices, including a primary wireless telephone 105, a secondary/backup wireless telephone 110, a personal digital assistant (PDA) 115 having wireless communication capabilities, a land-line telephone 120 that employs a public switched telephone network (PSTN), and a land line telephone 125 that employs voice over Internet protocol (VOIP) technology. Each of the various communication devices 105, 110, 115, 120, 125 operates with a network interface 130 that provides an appropriate communication interface to enable communication services. For example, the network interface 130 may include wireless telephone towers (e.g., "cell towers") to provide wireless communication services to/from wireless telephones 105, 110 and PDAs 115. The network interface 130 may also include a PSTN interface 135 and a VOIP interface 140 to provide communication services to land-line telephones 120 and 125, respectively. Persons of ordinary skill in the art will appreciate that a land-line telephone 125 that communicates by way of VOIP technology typically connects to a network 145, such as the Internet via a cable/DSL modem (not shown).

Communication service providers, such as telephone companies, may own and/or lease various network interfaces 130 throughout a particular locality. Each of the network interfaces 130 is communicatively connected to a telecommunication network 150, which typically interconnects other network interfaces, such as those separated by large distances (e.g., East coast to Midwest to West coast). The telecommunication network 150 may include an infrastructure of telephone/data cables, relay antenna, satellites, repeater stations, digital concentrators, fiber optics, switch centers, etc.

A backup wireless device server 155 ("server") is communicatively connected to the telecommunication network 150, as well as communicatively connected to a database 160, and the network 145, such as the Internet. A user, technician, and/or customer service representative may access the server 155 via a computer/kiosk 165 and/or a computer 170 connected to the network 145. For example, the computer/kiosk 165 may be connected to the server 155 via a corporate intranet and the computer 170 may connect to the server 155 via a public or private website and/or a virtual private network (VPN). Generally speaking, the server manages, in part, wireless device activation, deactivation, location determination techniques, and user account management.

A backup wireless device set includes a number of wireless devices that a user controls (e.g., rents, leases, owns). The backup wireless device set may include the primary wireless telephone 105, which is enabled to allow the user to employ various services (e.g., telephone, instant messaging, Internet access, etc.), and a secondary/backup wireless telephone 110, which is disabled. While FIG. 1 illustrates two wireless telephones 105, 110 of the backup wireless device set, any number of wireless devices (e.g., wireless telephones, PDAs, etc.) may constitute the backup wireless device set without limitation. As discussed in further detail below, the user may add and delete wireless devices to/from the backup wireless device set via a graphical user interface (GUI), such as an Internet accessible web page serviced, for example, by the backup wireless device server 155. Any wireless devices in the set are constrained to allowing only a single wireless device to be enabled at one time. For example, if the user enters a valid activation code into the secondary/backup wireless telephone 110, then the primary wireless telephone 105 is disabled and the secondary/backup 110 is enabled. As a result, the user continues to consume wireless services from the same wireless account, that is, other callers dial the same telephone number to reach the user as previously dialed.

Similarly, if the user leaves home and forgets to take the primary phone 105, then the user may activate any of the alternate wireless devices of the backup set. For example, if the user always keeps a secondary wireless telephone 110 in the glove-compartment of a car, then such secondary phone 110 may be activated upon the user's entry of a valid activation code associated with the user's account. As discussed above, activation of the backup wireless phone 110 may automatically deactivate the primary wireless phone 105. In the unfortunate circumstance in which the user's primary wireless phone 105 is stolen, activation of the backup wireless phone 110 will deactivate the primary wireless phone 105, thereby minimizing fraudulent use (e.g., wireless minutes consumption, overseas telephone calls, 900-number charges, etc.). However, if the user does not have the secondary wireless phone 110 immediately available for activation, the user may access the backup wireless device server 155 via a land-line phone 120, 125 or any alternate telephone available to inform the server 155 of the situation. For example, upon the user learning that their primary wireless phone 105 (or any other wireless device in the backup set) is stolen, the user may find the nearest payphone, land-line phone or a wireless phone (perhaps the wireless phone of a friend or good-Samaritan) to call the backup wireless device server 155 to deactivate the stolen primary phone 105. Additionally, the user may access the Internet and/or network accessible web page and deactivate a lost or stolen phone after providing valid authentication credentials. As discussed in further detail below, the Internet and/or network accessible web page allows the user to activate wireless devices, deactivate wireless devices, manage account information, and invoke various procedures to relocate the wireless device if it is lost or stolen.

Wireless devices in the backup set that are inactive may display various messages on a display screen of the device, if any. For example, a secondary wireless phone 110 may display the message, "Please enter an activation code to enable services for this phone." As discussed in further detail below, the user may configure each of the devices in the backup set via an interactive GUI. The GUI allows the user to configure canned and/or customized display messages and invoke responsive instructions to execute upon activation and deactivation of wireless devices in the backup set. An e-mail message may be sent to the account owner (user) of the backup set when any particular device in the set changes status from active to inactive (stand-by), or vice-versa. Alternatively, if the user makes a regular habit of activating various wireless devices of the backup set, frequent e-mail notification or voice-mail notification messages would be cumbersome, and may be disabled.

In the unfortunate event of a lost or misplaced phone, the user may activate the secondary phone 110 for interim functionality while a search is conducted for the primary phone 105. Additionally, the user may configure and/or control the server 155 to aid in determining the whereabouts of the lost or misplaced phone. For example, the server 155 may cause the lost or misplaced phone to ring, light-up, beep, and/or vibrate on a periodic basis to aid the user in relocating the phone. Persons of ordinary skill in the art will appreciate that various known triangulation techniques and/or global positioning satellite (GPS) services that are frequently built into wireless devices may be employed to help relocate the device. The server 155 may invoke location services to pin-point the lost or misplaced telephone and send an e-mail and/or text message to the user with location information (e.g., latitude and longitude coordinates, street address, nearest business, a map image showing device location, etc.). Such location techniques are also particularly useful for locating a stolen phone.

The backup wireless device server 155 controls and/or enables various functionality of wireless devices in the backup set with the aid of a backup account table, one example of which is shown in FIG. 2 at reference numeral 200. The example table 200 includes a user column 205 identifying various users that have a backup set. The user column 205 may include a number of rows, each of which identifies a user and the user's respective wireless devices. To this end, the table 200 includes an electronic identifier (EID) column 210, a mobile identification number (MIN) column 215, an activation code column 220, and a status column 225.

The EID column 210 includes an associated EID for each device that the user has in a backup set. Persons of ordinary skill in the art will appreciate that the wireless telephone industry typically associates each phone with a unique number (e.g., a 32-bit electronic serial number (ESN), an international mobile equipment identity (IMEI), etc.) that is programmed into the phone when it is manufactured. EIDs allow, among other things, a wireless service provider to determine which wireless phones are authorized for use on the network. The EIDs also allow a wireless provider to verify that a proper accounting is made of all activity. The example EIDs illustrated in FIG. 2 are 3-digit hexadecimal values, but the EIDs could include numeric and/or alphanumeric sequences of any length or numeric base (e.g., decimal, binary, octal). Without limitation, a system identification code (SID), which is typically a unique 15-bit number assigned to each wireless service provider by the Federal Communication Commission (FCC) or a recognized SID administrator, may also be programmed into the wireless device to allow wireless providers a way to identify authorized wireless devices, and identify device roaming status. The example table 200 of FIG. 2 illustrates using the EID for device identification, although any other unique identifier, and/or combination of identifiers, may be used without limitation.

The table 200 MIN column 215 identifies the associated MIN (typically a 10-digit phone number) for each wireless device having a unique EID. Although every wireless phone must have a unique EID pursuant to FCC regulations, multiple wireless phones may have the same telephone number (i.e., MIN) as long as the wireless service provider has methods in place to handle billing and fraud detection. The table 200 of FIG. 2 illustrates an example user named Bob Smith 230 that has two wireless devices, each having a unique EID. Each of the wireless devices (e.g., wireless telephones) is assigned the same MIN so that either phone will correctly send and/or receive calls in a similar manner. In other words, when a caller dials 555-555-1212, the first phone (associated with a first EID of 25A) will ring if it is active, otherwise the second phone (associated with a second EID of 3B4) will ring. Additionally, the table 200 of FIG. 2 illustrates that each wireless device includes an associated activation code 220. Entry of the activation code 220 by a wireless device will result in activation of that wireless device if the activation code 220 is also associated with the corresponding ESN 210. For example, if the owner of the phone having an the EID of 25A (i.e., Bob Smith) enters the activation code 102803 (which is associated with the EID of 17C (i.e., Jane Doe), then the server 155 will not permit activation of the wireless device having the EID of 25A. On the other hand, if the owner of the phone having the EID of 25A enters the activation code 101671, then the server 155 will allow the activation of that phone.

As discussed above, the particular phone that will ring when called (or perform any other services associated with the phone) is dependent upon a status setting, such as those illustrated in the status column 225. If the user named Bob Smith enters an activation code "081772" for the second phone (associated with the second EID of 3B4), then the second phone status will change from "stand by" 245 to "active," which will result in the status of the first phone changing from "active" 250 to "stand by." In other words, the phones' statuses will toggle. If only two phones reside in a user's account, then those phones will have an activation status that is mutually exclusive so that when the first phone 235 is active, the second phone 240 is inactive. Similarly, when the second phone 240 is active, the first phone 235 is inactive.

In response to a status change for any of the wireless devices of a user's backup set, the backup wireless device server 155 transmits authorization instructions to the telecommunications network 150. The authorization instructions include, but are not limited to, instructions to disable a wireless device with a particular EID that was previously active, enable a wireless device with a particular EID, triangulate the location of a wireless device, obtain GPS data from a wireless device, and display messages on a wireless device. Persons of ordinary skill in the art will appreciate that the telecommunications network 150 may include hardware and software elements appropriate to facilitate the instructions sent by the backup wireless device server 155. Such hardware and software elements may facilitate wireless telephone technologies such as frequency division multiple access (FDMA), time division multiple access (TDMA), code division multiple access (CDMA), global system for mobile communications (GSM), personal communications services (PCS), and/or third generation (3G) technology. Additionally, the telecommunication network 150 may include intelligent peripherals and/or service nodes (IP/SN) to manage the flow of communications between callers. IP/SN devices may provide routing and/or control services in conjunction with advanced intelligent networks (AINs), signal control points (SCPs) and/or signal transfer points (STPs), as are known by persons of ordinary skill in the art.

In one example, users that choose to participate in wireless device backup activation and de-activation may purchase a kit from a retailer that contains two or more wireless devices, such as a kit containing two wireless telephones. Each phone contained within packaging material of the kit has a corresponding unique EID and a unique activation code, but the MIN for both phones is set to be the same. The activation codes may be printed on the kit packaging or contained within the packaging material. After the kit purchase, the user may register the phones with a wireless service provider and establish an alternate MIN, if necessary or permitted by the wireless service provider. Registration of the phones in the kit may be accomplished with the aid of the wireless service provider, such as a wireless store, and/or the user may follow registration procedures by calling a customer service phone number (e.g., from the user's home phone). Additionally, the kit registration may be totally self-service, such that the user may access a web site to register each phone (e.g., enter EID, MIN, activation codes). In addition to enabling a user to enable and disable communication devices, the web site GUI may also permit the user to enter payment information and determine account status information (e.g., account balance, minutes used, features activated, etc.).

Similarly, a user may purchase a kit containing a single wireless device, such as a kit containing a single wireless telephone. Much like the kit containing two phones described above, the phone in the single phone kit has a unique EID and a unique activation code. Such single phone kits are particularly useful for users that already have an established wireless phone and service plan. The wireless service providers that offer backup wireless device services may allow users to register the kit devices in much the same manner as described above. Additionally, the registration process may allow the user to configure the kit phone to have the same MIN as the phone for which already had service. Moreover, the registration process may allow the user to assign a unique activation code to the phone for which they already had service.

Car rental agencies may also provide a user, for example, with a spare wireless device for the duration of a vacation and/or business trip. Such a spare wireless device may be waiting for the user in the rental car ready for activation upon the entry of the activation code. This may allow the user to gain the benefit of wireless communications in a locality that is not well-adapted for any particular wireless device that the user owns. Conversely, the car rental agency, either independently or in cooperation with a telecommunication business, may provide rental wireless devices to customers that are ideally adapted for each particular locality.

To configure wireless device rental for a user in an efficient manner, the user may provide the rental agency with a semi-private account number. The semi-private account number allows the rental agency to associate a specific device EID with the user's account, thereby eliminating privacy issues for the user. Upon reaching the rental vehicle, in which the rental wireless device is located, the user may activate the rental wireless device with an activation code provided by the rental agency.

Figure 3:
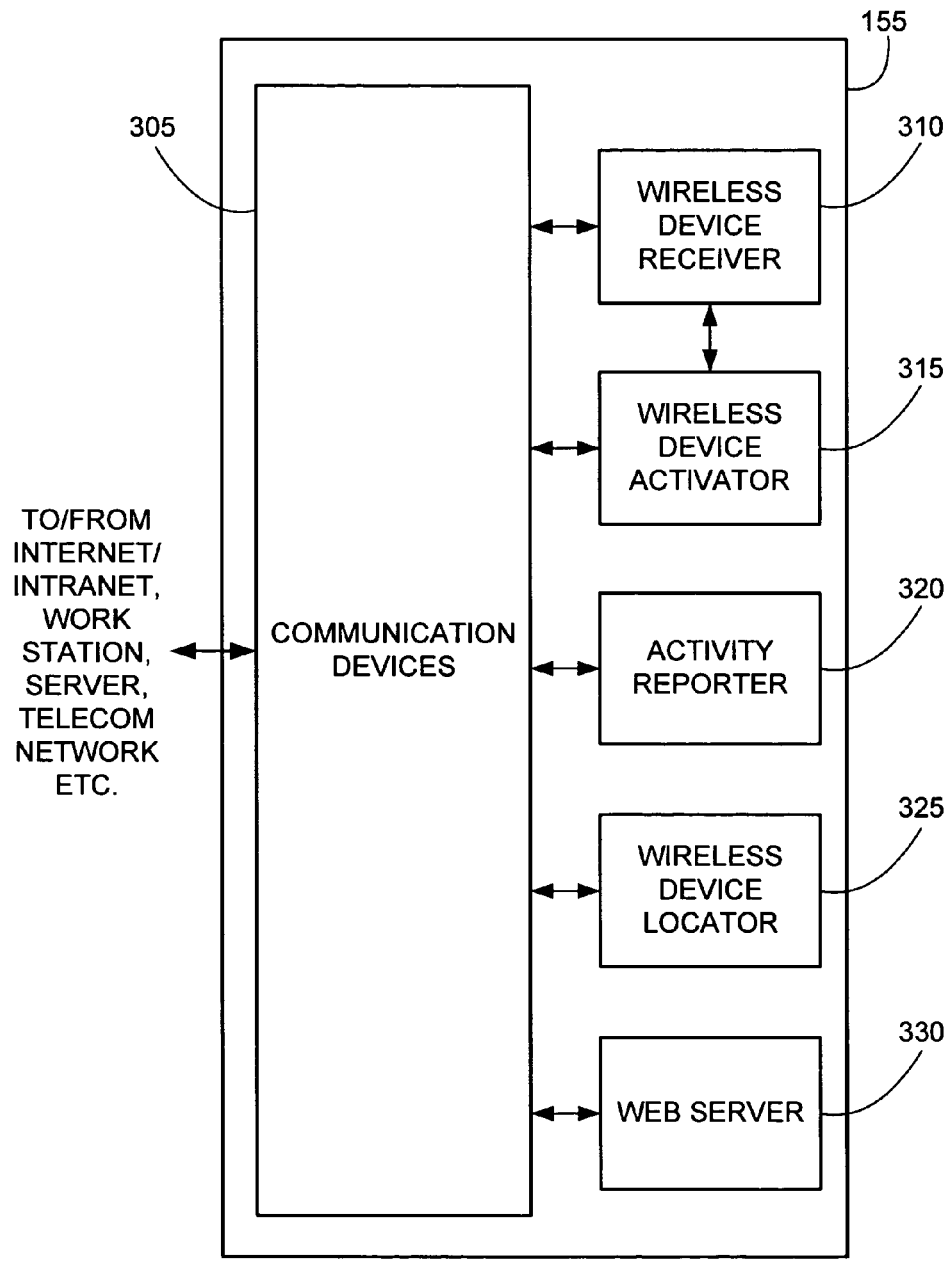
FIG. 3 is a block diagram showing further detail of an example backup wireless device server of FIG. 1.

An example backup wireless device server 155 is shown in FIG. 3. In the illustrated example, the user(s) may access various backup wireless device sub-modules via the network 145 (e.g., Internet/intranet), telecommunications network 150, workstations/kiosks 165, and one or more communication devices 305. The communication devices 305 may enable communication via web-pages, database server engines, and/or graphical and/or command-line user interfaces and/or kiosks. In the illustrated example of FIG. 3, the backup wireless device server 155 includes a wireless device receiver 310, a wireless device activator 315, an activity reporter 320, a wireless device locator 325, and a web server 330. Each of the aforementioned modules interacts with the communication device(s) 305 to provide an interface to receive and process inputs/outputs (I/O) related to services provided by the backup wireless device server 155.

The wireless device receiver 310 receives activation codes from wireless devices and compares them to the device identifier (e.g., an EID, an ESN, an IMEI, or other identification code). Received activation codes and the associated EID extracted from a signal request are compared against an activation code and EID stored in the database 160. For example, the database 160 may be queried via a structured query language (SQL) engine for the received EID. Furthermore, the EID record, if found, is searched for a corresponding valid activation code. If the activation code and EID of the database 160 matches the EID and activation code received by the wireless device receiver 310, then the wireless device receiver 310 deems the requesting wireless device as an authorized user of the system 100.

The wireless device activator 315 facilitates activation and deactivation of various wireless devices of the system 100. Additionally, prior to activating and/or deactivating wireless devices (e.g., mobile telephones 105, 110, PDAs 115, etc.), the wireless device activator 315 verifies that the wireless device requesting activation is authorized by communicating with the wireless device receiver 310. As discussed above, the wireless device receiver 310 receives device requests that may originate from the network/Internet 145, telecommunications network 150 (e.g., land-line phone call, cell-phone call, etc.), workstation/kiosk 165) to verify that the transmitted activation code and EID match a valid user account, such as the accounts shown in FIG. 2. Requests for activation from valid accounts are accepted by the wireless device activator 315 to activate one of several wireless devices the user may have. Furthermore, the wireless device activator 315 determines which, if any, wireless devices are currently active and deactivates such devices so that only one of the wireless devices is active at one time.

The activity reporter 320 tracks events of the various wireless devices the user may have in a user account, such as the user accounts shown in FIG. 2. For example, if Jane Doe enters the activation code 102803 on the phone having the EID 17C, then the activity reporter 320 records such activity in a memory, such as the database 160. Each user may configure the activity reporter 320 to notify the user of activity changes in various ways. If Jane Doe only uses the phone having the EID 17C sparingly and/or for emergencies, then the activity reporter 320 may be configured to send an e-mail and/or voice-mail message to the user including details of the status change. Details may include, but are not limited to, date and time of status change from stand-by to active, originating device that made the activity change request (e.g., activation code entered via a backup wireless phone or via a web-based user interface, etc.), and the geographic location in which the activating device resides (e.g., latitude/longitude coordinates of the wireless device that provided an authorized activation code. In particular, the wireless device locator 325 invokes location determination functions of the wireless device(s) to acquire latitude/longitude coordinates of the previously-active GPS enabled wireless device (i.e., the wireless device with EID A4F) to aid in relocating the device. Additionally or alternatively, such relocation functions may be accessed by the user via a web-based user interface via the web server 330, as discussed in further detail below.

Figure 4:
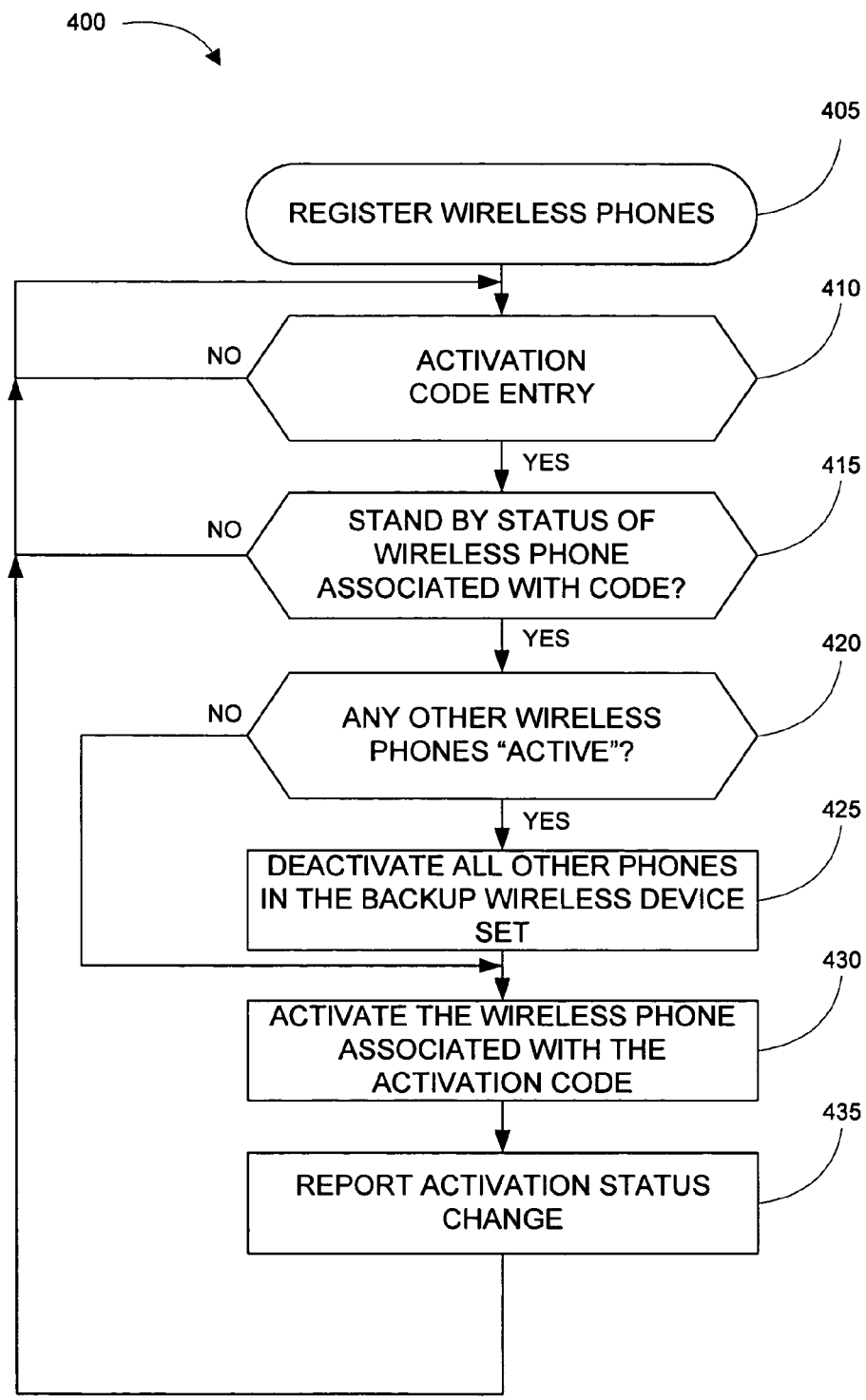
FIG. 4 is a flow diagram of an example process to enable backup wireless devices in the example system of FIG. 1.
Figure 5:
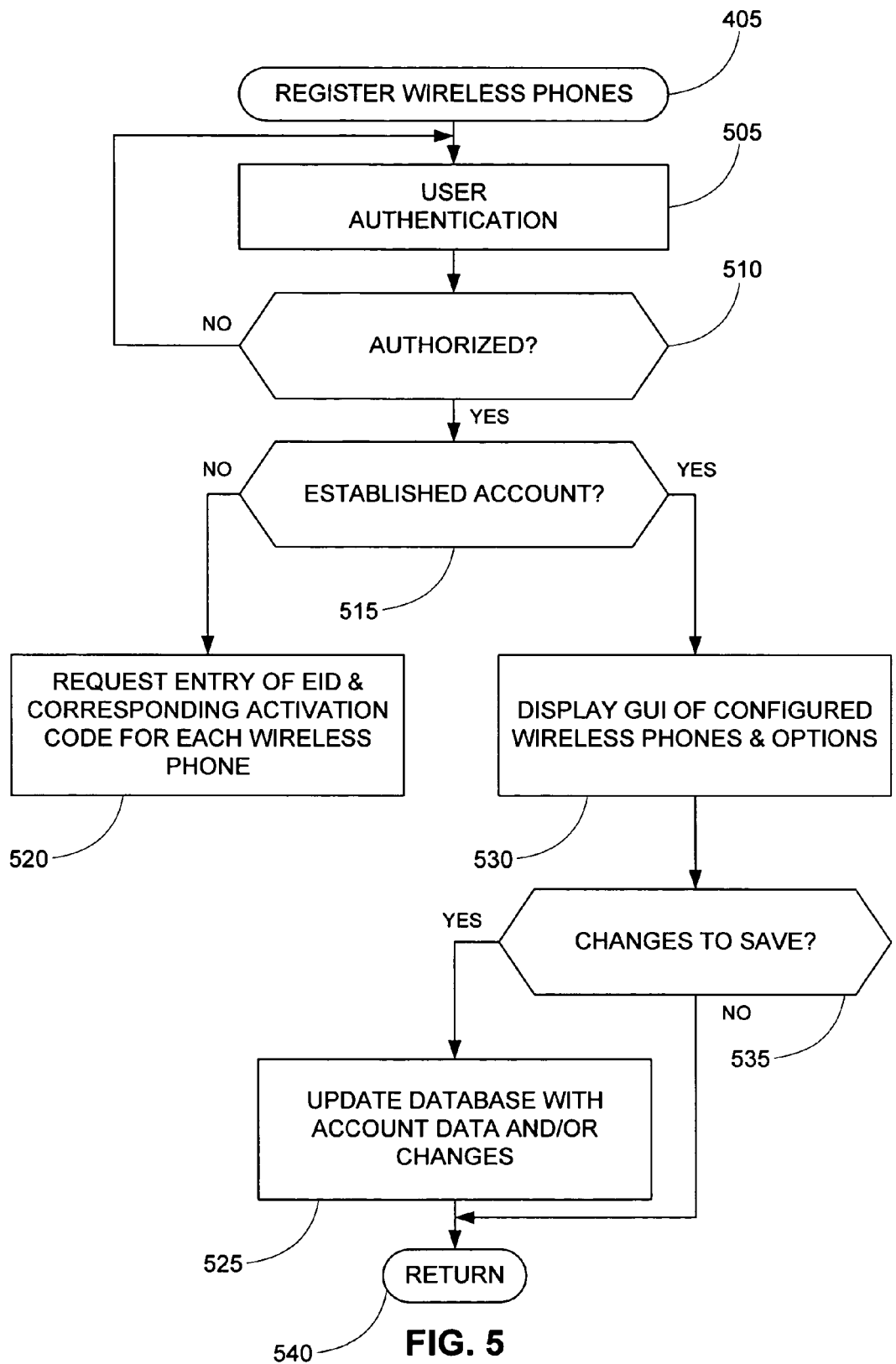
FIG. 5 is a flow diagram of an example process to register wireless devices.

Flowcharts representative of example logic, such as machine readable instructions, or hardware and/or software for implementing the example systems, methods, and apparatus to enable backup wireless devices of FIGS. 1 through 3 are shown in FIGS. 4 and 5. In these examples, the logic may be machine readable instructions that form a software or a firmware program for execution by: (a) a device including a processor such as the processor 710 shown in the example computer 700 discussed below in connection with FIG. 7, (b) a controller, and/or (c) any other suitable processing device. The process may be embodied in software stored on a tangible medium such as, for example, a flash memory, a CD-ROM, a floppy disk, a hard-drive, a digital versatile disk (DVD), or a memory associated with the processor 710, but persons of ordinary skill in the art will readily appreciate that the entire process and/or parts thereof could alternatively be executed by a device other than the processor 710 and/or embodied in firmware or dedicated hardware in a well-known manner (e.g., it may be implemented by an application specific integrated circuit (ASIC), a programmable logic device (PLD), a field programmable logic device (FPLD), discrete logic, etc.). For example, any or all of the network interface 130, backup wireless device server 155, example backup account table 200, communication devices 305, wireless device receiver 310, wireless device activator 315, activity reporter 320, wireless device locator 325, and web server 330 of FIGS. 1 through 3 could be implemented by software, hardware, and/or firmware. Also, some or all of the processes represented by the flowcharts of FIGS. 4 and 5 may be implemented manually. Further, although an example process is described with reference to the flow chart illustrated in FIGS. 4 and 5, persons of ordinary skill in the art will readily appreciate that many other methods of implementing the example processes may alternatively be used. For example, the order of execution of the blocks may be changed, and/or some of the blocks described may be changed, substituted, eliminated, or combined.

The process 400 of FIG. 4 begins at block 405 where the example backup system 100 registers wireless devices for use with the system 100. Although the example process 400 of FIG. 4 illustrates wireless telephones as one type of wireless device that works with the backup system 100, other types of wireless devices may be used without limitation. For example, wireless devices may include wireless phones that employ various network technologies (e.g., TDMA, GSM, 3G, etc.), wireless telephones having PDA functionality, and/or PDAs having mobile communication capabilities (e.g., voice, data, video, etc.). Wireless phone registration 305 is discussed in further detail below in view of FIG. 5.

After registration, the system 100 monitors for the entry of an activation code (block 410). In particular, the backup wireless device server 155 monitors activation codes from wireless devices (e.g., wireless phones 105, 110, and PDA 115), as well as activation codes that may be sent by a land-line phone (e.g., the land line phones 120, 125). Additionally, the server 155 monitors for activation codes that may be entered by a user's computer 170 via the network/Internet 145 and/or a workstation/kiosk 165 used by a customer service representative and/or authorized reseller of wireless services. Such workstations/kiosks 165 may communicatively connect to the server 155 via an Intranet connection, network, and/or a VPN.

As discussed above, in the disclosed system wireless devices having a status of "stand by," "inactive," or "disabled" are not permitted to consume wireless services, but may execute a limited set of functions to accomplish transmitting an activation code. In one example, the activation code is transmitted from a backup/secondary wireless phone 110, to the network interface 130 (e.g., a cell tower), to the telecommunications network 150, and then to the backup wireless device server 155. Persons of ordinary skill in the art will appreciate that other routes of wireless phone data propagation are also applicable. The server 155, in addition to its other tasks, awaits receipt of activation codes (block 410). When an activation code is received, the server 155 determines the other wireless devices that may be associated with the activation code by querying the database 160 (block 415).

As discussed above, in view of FIG. 2, the backup account table 200 is typically stored on the database 160 and contains the user's backup wireless device set. In other words, the backup set is the set of wireless devices that will toggle from a state of stand by to active, and vice-versa, upon the user's entry of the code. If the user enters an activation code on the secondary/backup phone having a corresponding EID of 3B4 that is any other valve than 081772, the process proceeds from block 415 to block 410 and the server 155 continues to monitor for activation codes (block 410). A mismatch between the EID of 3B4 and proper activation code may suggest an innocent mistake on behalf of the user, thus the program 400 provides the user an additional opportunity to re-enter the activation code (block 410). On the other hand, a number of failed attempts, especially during a short period of time, may suggest that the secondary/backup phone has been stolen. After a threshold number of failed attempts is reached, the server 155 may refuse to accept any further attempts, lock-out the phone, and/or display a message on the display portion of the phone indicating as such.

If the user enters an activation code that directly corresponds to the ESN of the wireless device from which the code was sent, then the process determines if any other wireless devices, within the user's set, are active (block 410). For example, entry of the activation code 081772 of the EID 3B4 corresponds to a user named Bob Smith. The account number for Bob Smith is 1234 and this same account number is also associated with an additional wireless device having the EID of 25A. As such, the example table 200 shows that the user Bob Smith has a set that includes two wireless phones, one having the EID of 25A that is currently active 250, and another wireless phone with the EID of 3B4 that has a status of stand-by 245. In view of the wireless phone with the EID of 25A having a status of active 250, the server 155 deactivates all other devices in the set (block 425). On the other hand, if the server 155 determines that the activation code just entered is part of a set for which no other devices are active, the server 155 activates the wireless device that is associated with the activation code (block 430), thereby resulting in only one of the set devices permitting wireless services. Moreover, the phone that was previously active is now inactive and the server 155 changes the status column 225 of the table 200 in the database 160 accordingly.

A report of status change activity is generated by the server 155 (block 435). The server, upon detection of a status change for the various devices in a set, and/or the attempted status changes by activation code entries, may send an e-mail notification message to the user. Additionally, or alternatively, the server 155 may provide the user with an automated voice-mail message to communicate a status change, and/or status change attempt. The server 155 may also cause one or more of the inactive wireless devices to display a message in case the device(s) was lost or stolen. For example, the server 155 may place the message, "If found, please contact Bob Smith at 555-1028" on the display screen of the lost or stolen wireless device.

A flowchart representative of a process for implementing phone registration (block 405 in FIG. 4) is shown in FIG. 5. The process 405 of FIG. 5 begins when a new user establishes an account with the wireless service provider (block 505). As discussed above, the new user may provide contact information (e.g., name, address, phone), payment information (e.g., credit card number, automatic funds transfer routing information), and a username and password. User data may be saved on the database 160. Alternatively, if a user already has an established account (e.g., an account in which one or more devices are configured), the process 405 authorizes the user's credentials (block 510). Authorization may occur via a web site accessed by the user, entry of the user name and password via a touch tone telephone system, and/or via a customer service representative that answers calls from users. Failed authorization attempts cause the process 405 to allow the user to re-attempt system 100 access (block 505).

Users that provide authorized credentials (block 510), but do not yet have an established account (block 515) are presented with an opportunity to enter an EID and a corresponding activation code for each of their wireless devices (block 520). As discussed above, the user may enter such information via a web-based GUI, telephone menu system, or with the aid of a customer service representative. The new EID and corresponding activation code information is added to the database 160 (block 525).

Users that provide authorized credentials (block 510) and already have an established account (block 515) are presented with an opportunity to edit their account (block 530). Changes to the existing account details may be made via a web-based GUI, a telephone menu system, or with the aid of a customer service representative (block 530). Additionally, the user may perform various tests with the GUI, such as attempt to locate their phone via GPS and/or RF based triangulation techniques. For example, if the authorized user has just lost a primary and/or secondary wireless device, the user may employ the GPS and/or RF based triangulation techniques to re-locate the lost or stolen phone, as discussed in further detail below. When the user is finished viewing the example GUI (block 535) and decides to save any changes to the account, the updated information is saved to the database 160 (block 525). Alternatively, if the user is merely evaluating the existing account settings, then nothing is saved to the database 160 (block 535) and the process returns (block 540) to FIG. 4 (block 405).

Figure 6:
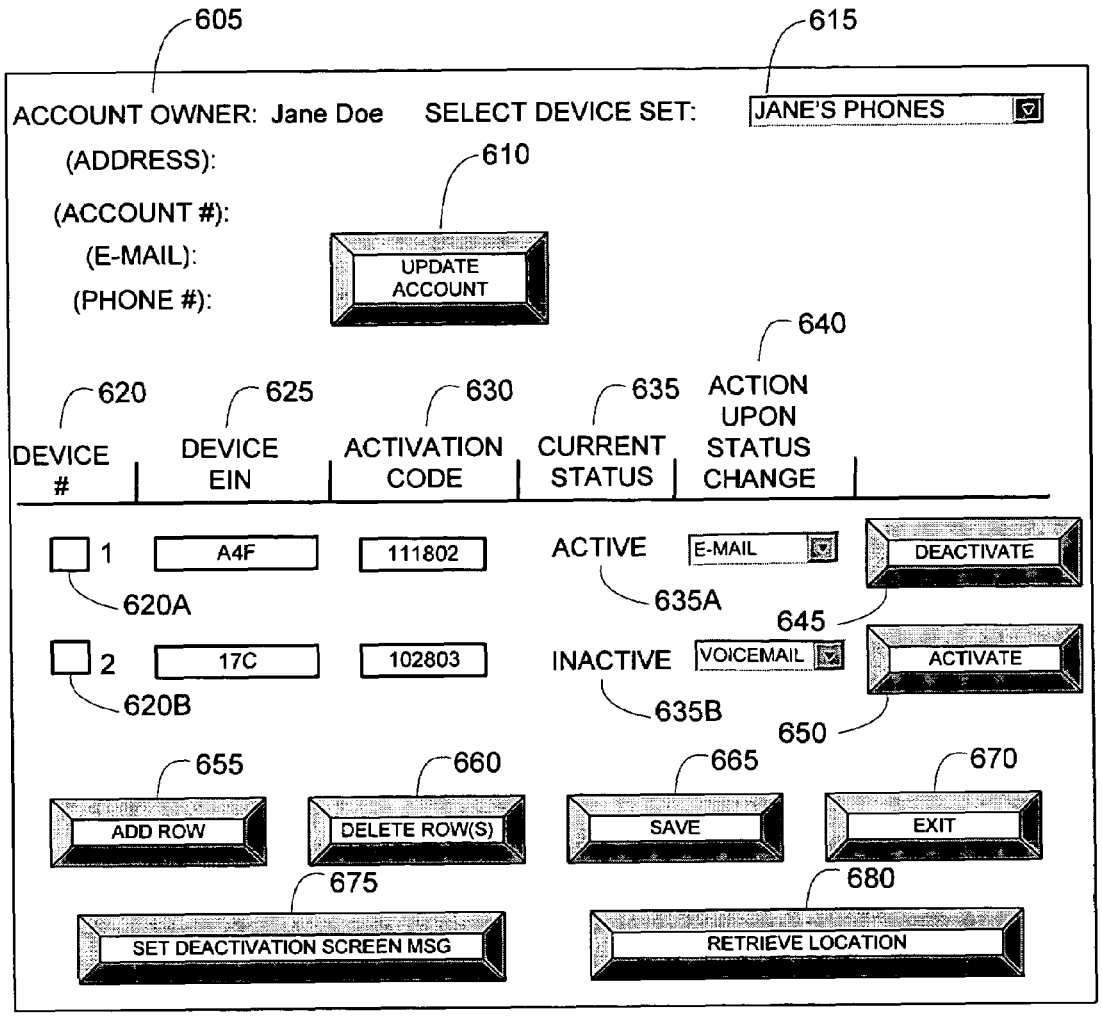
FIG. 6 is an example graphical user interface for use in the example system of FIG. 1.

An example GUI 600 that may be provided by the backup handset server 155 for communicating account detail information, such as that described in conjunction with FIG. 5, is shown in FIG. 6. The GUI 600 may be implemented as a web page, or by any other format known to persons of ordinary skill in the art. The GUI 600 may be used by the user/customer upon entry of valid user credentials (authentication) or used by a customer service representative of a wireless telecommunication store. The authenticated user is presented with name and address information 605 and an update account button 610 in case changes to the address and/or e-mail account are needed. Because each account owner may have more than one device set, the user is provided with a device set drop-down menu 615 so that details related to the selected device set may be shown below. For example, the example account owner (i.e., Jane Doe) may have two device sets, one for herself that includes a primary and secondary phone, and another device set for her child. The second device set for her child may also include a primary wireless phone typically carried by the child, and a secondary wireless phone that stay's in, for example, the child's vehicle glove compartment.

Each selected device set 615 displays several columns of information relating to each of the wireless devices within the set. For example, each wireless telephone includes a device number column 620, a device EID column 625, an activation code column 630, a current status column 635, and an action upon status change column 640. The device number column 620 includes check-boxes 620a, 620b that a user may select in combination with other buttons of the GUI 600, discussed below. The device EID column 625 displays the RID for each wireless device in the user's device set. As discussed above, the EID may be a unique 3-digit hexadecimal number programmed into each wireless telephone when it is manufactured for the purpose of, inter alia, device identification and authorization. The activation code column 630 lists the corresponding activation code for each wireless device of the device set, thereby allowing the user to recall such activation number(s) in case they are forgotten. The current status column 635 indicates which of the wireless devices of the user's device set are active and which are inactive.

While the example GUI 600 of FIG. 6 illustrates that the user named Jane Doe has only two wireless devices, any number of additional devices may reside in the device set. Regardless of the total number of wireless devices in the device set, only one of them may have a status of "active," 635A as shown in the current status column 635. Moreover, the current status designation of a wireless device in the current status column 635 is always the opposite of a corresponding toggle button 645, 650. For example, device number 1 has a current status of "active" 635A and the toggle button 645 for device number 1 has the opposite label of "deactivate." Similarly, device number 2 has a current status of "inactive" 635B and the toggle button 650 for device number 2 has the opposite label of "activate." The effect of a user selecting the deactivate toggle button 645 is that device number 1 will become inactive, thereby preventing communication services in case it has been lost or stolen. On the other hand, if wireless device 1 and 2 have a status of active 635A and inactive 635B, respectively, and the user selects the activate toggle button 650, then device number 1 is deactivated while device number 2 is activated so that no more than one wireless device has the status of active.

The action upon status change column 640 provides the user with a drop-down list of actions that execute upon a device status change. For example, if the status of device number 1 changes from active to inactive, the user receives an e-mail notification of such status change. Similarly, if the status of device number 2 changes from inactive to active, the user receives a voicemail notification of such status change.

When the user adds additional devices to the selected device set 615, an add row button 655 is selected to create a new blank row. The user may then populate the various columns of information based on the new wireless device details, such as the device EID, activation code, and action upon status change. On the other hand, when the user deletes a wireless device from the selected device set 615, the user first places a check in one or more of the device number check boxes 620A, 620B. For example, if the user places a check in the check box 620A for device number 1 and subsequently selects the delete row button 660, then device number 1 is removed from the selected device set 615. The user may choose such an option if there is little question that the selected wireless device will never return to service, such as when the wireless device is stolen or destroyed beyond repair.

Any changes made to the selected device set 615 may be saved to the database 160 by selecting a save button 665. On the other hand, if the user does not make any changes, or makes changes but decides that they are no longer desired, then the user may select an exit button 670 to exit the GUI 600 without saving any changes to the database 160.

Customized screen messages may be placed on the wireless device screens if the user selects a set deactivation screen message button 675. For example, if the user loses device number 1, the user may place a check in the device number 1 check box 620A and select the set deactivation screen message button 675. As a result, the user may be presented with a dialog box to enter a text message that will be displaced on the screen of device number 1. For example, the user may enter the following message as an aid to locate the lost phone, "This phone is lost. Please call 555-1212 if found."

Another method of lost wireless phone recovery includes a retrieve location button 680. For example, if the user loses device number 1, the user may place a check in the device number 1 check box 620A and select the retrieve location button 680. Persons of ordinary skill in the art will appreciate that wireless devices that are equipped with GPS technology and/or RF triangulation technology may be located in this manner. Additionally, any resulting data from the "lost" phone may be sent back to the user in an e-mail message as a latitude and longitude, a street address, and/or a map image of the "lost" phone's location.

Figure 7:
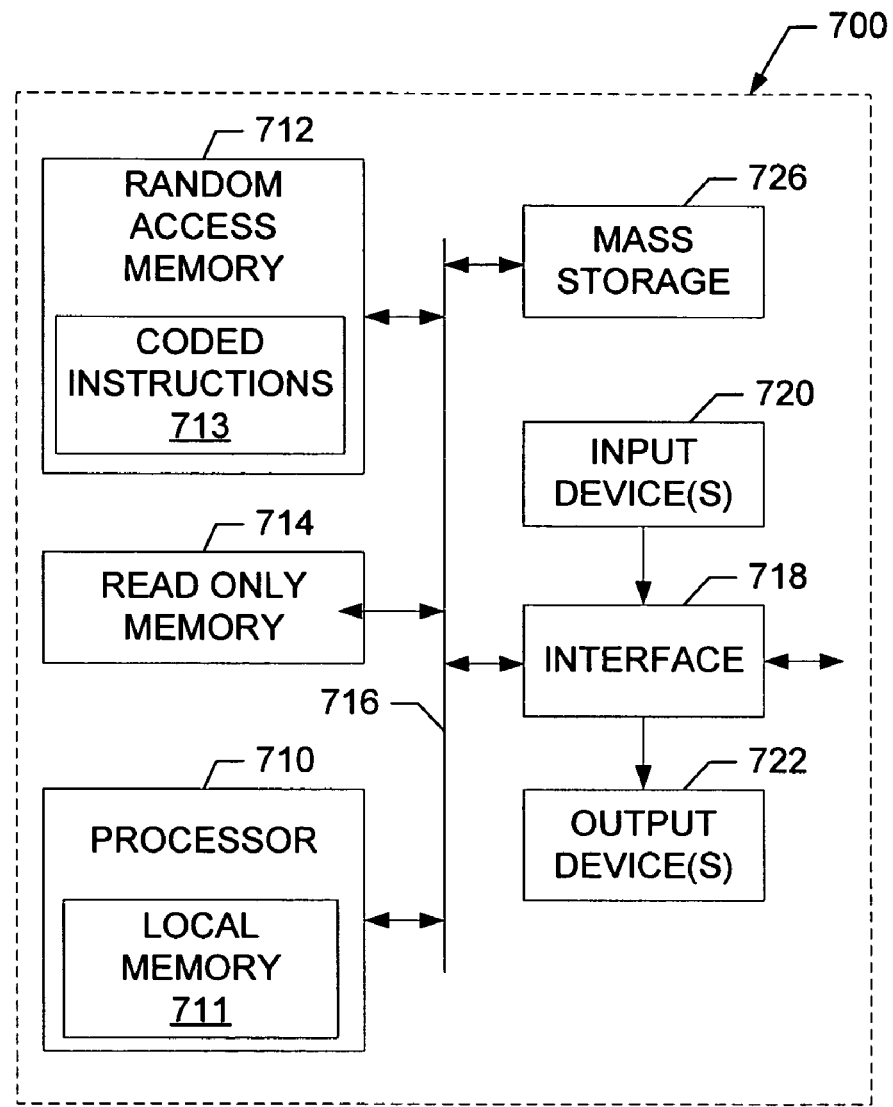
FIG. 7 is a schematic illustration of an example computer that may execute the processes of FIGS. 4 and 5 to implement the example system of FIG. 1.

FIG. 7 is a block diagram of an example computer 700 capable of implementing the apparatus and methods disclosed herein. The computer 700 can be, for example, a server, a personal computer, a laptop, a PDA, or any other type of computing device.

The computer 700 of the instant example includes a processor 710 such as a general purpose programmable processor. The processor 710 includes a local memory 711, and executes coded instructions 713 present in the local memory 711 and/or in another memory device. The processor 710 may execute, among other things, the example processes illustrated in FIGS. 4 and 5. The processor 710 may be any type of processing unit, such as a microprocessor from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 710 is in communication with a main memory including a volatile memory 712 and a non-volatile memory 714 via a bus 716. The volatile memory 712 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 714 may be implemented by flash memory and/or any other desired type of memory device. Access to the main memory 712, 714 is typically controlled by a memory controller (not shown) in a conventional manner.

The computer 700 also includes a conventional interface circuit 718. The interface circuit 718 may be implemented by any type of well known interface standard, such as an Ethernet interface, a universal serial bus (USB), and/or a third generation input/output (3GIO) interface.

One or more input devices 720 are connected to the interface circuit 718. The input device(s) 720 permit a user to enter data and commands into the processor 710. The input device(s) can be implemented by, for example, a keyboard, a mouse, a touchscreen, a track-pad, a trackball, isopoint and/or a voice recognition system.

One or more output devices 722 are also connected to the interface circuit 718. The output devices 722 can be implemented, for example, by display devices (e.g., a liquid crystal display, a cathode ray tube display (CRT), a printer and/or speakers). The interface circuit 718, thus, typically includes a graphics driver card.

The interface circuit 718 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 700 also includes one or more mass storage devices 726 for storing software and data. Examples of such mass storage devices 726 include floppy disk drives, hard drive disks, compact disk drives and digital versatile disk (DVD) drives. The mass storage device 726 may implement the database 160.

Although certain example methods, apparatus, and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A computer implemented method to enable backup wireless devices comprising:
   receiving a first activation code from a first wireless device;
   comparing the first activation code associated with the first wireless device with a first activation code in a database;
   activating the first wireless device when the first activation code associated with the first wireless device matches the first activation code in the database;
   when a second wireless device is active, deactivating the second wireless device in response to receipt of the first activation code associated with the first wireless device;
   detecting unauthorized use of the first wireless device by identifying an incorrect first activation code entered at the first wireless device; and
   sending an e-mail message indicative of the unauthorized use to an account owner of the first wireless device in response to identifying the incorrect first activation code.

2. A method as defined in claim 1 wherein the first activation code is associated with a first identifier.

3. A method as defined in claim 2 wherein a user interface provides access to the first activation code and the first identifier.

4. A method as defined in claim 1 further comprising a server to toggle activation of the first wireless device and the second wireless device.

5. A method as defined in claim 4 further comprising assigning an activation status to the first wireless device and the second wireless device in a mutually exclusive manner.

6. A method as defined in claim 1, further comprising:
   displaying a wireless device configuration screen area to display at least one of a wireless device identification, a wireless device identifier, a wireless device activation status, or a wireless device activation code; and
   receiving, via a plurality of user selectable buttons, a selection to at least one of add a wireless device, delete a wireless device, or associate a wireless device identifier with a wireless device activation code.

7. A method as defined in claim 1, further comprising sending a voice mail message indicative of the unauthorized use to the account owner of the first wireless device in response to identifying the incorrect first activation code.

8. A method as defined in claim 1, wherein detecting unauthorized use of the first wireless device further comprises identifying a threshold number of incorrect first activation code entries at the first wireless device.

9. A method as defined in claim 8, further comprising locking-out the first wireless device in response to receiving the threshold number of incorrect first activation code entries.

10. An article of manufacture storing machine readable instructions which, when executed, cause a machine to:
    receive a first activation code from a first wireless device;
    compare the first activation code associated with the first wireless device with a first activation code in a database;
    activate the first wireless device when the first activation code associated with the first wireless device matches the first activation code in the database;
    when a second wireless device is active, deactivate the second wireless device in response to receipt of the first activation code associated with the first wireless device;
    detect unauthorized use of the first wireless device by identifying an incorrect first activation code entered at the first wireless device; and
    send an e-mail message indicative of the unauthorized use to an account owner of the first wireless device in response to identifying the incorrect first activation code.

11. An article of manufacture as defined in claim 10 wherein the machine readable instructions further cause the machine to associate the first activation code with the first identifier.

12. An article of manufacture as defined in claim 11 wherein the machine readable instructions further cause the machine to provide a user interface for access to the first activation code and the first identifier.

13. An article of manufacture as defined in claim 10 wherein the machine readable instructions further cause the machine to toggle activation of the first wireless device and the second wireless device.

14. An article of manufacture as defined in claim 13 wherein the machine readable instructions further cause the machine to assign an activation status to the first wireless device and the second wireless device in a mutually exclusive manner.

15. An article of manufacture as defined in claim 10, wherein the machine readable instructions further send a voice mail message indicative of the unauthorized use to the account owner of the first wireless device in response to identifying the incorrect first activation code.

16. A kit comprising:
    a first wireless device, the first wireless device comprising a first unique identifier and a first activation code; and a second wireless device, the second wireless device comprising a second unique identifier and a second activation code, wherein the second wireless device is activated and the first wireless device is deactivated in response to entry of the second activation code on the second wireless device, wherein unauthorized use of the first wireless device is detected by identifying an incorrect first activation code entered at the first wireless device, and wherein an e-mail message is sent indicative of the unauthorized use to an account owner of the first wireless device in response to identifying the incorrect first activation code.

17. A kit as defined in claim 16 wherein activation of the first wireless device and the second wireless device toggle in a mutually exclusive manner.

18. A kit as defined in claim 16 further comprising a product package, the first and second activation codes at least one of inside the product package, printed on the product package, or printed on the wireless devices.

19. A kit as defined in claim 16 wherein the first and second wireless devices are activated and deactivated by a server.

20. A kit as defined in claim 19 wherein the server receives the first and second activation codes and the first and second unique identifiers from the first and second wireless devices.

21. A kit as defined in claim 20 wherein the server compares the received activation code and unique identifier from at least one of the first or second wireless devices with an activation code and a unique identifier combination in a database.

22. A kit as defined in claim 21 wherein the server activates the first wireless device and deactivates the second wireless device when the compared activation code and the unique identifier received from the first wireless device matches the activation code and the unique identifier combination in the database.

23. A kit as defined in claim 21 wherein the server activates the second wireless device and deactivates the first wireless device when the compared activation code and the unique identifier received from the second wireless device matches the activation code and the unique identifier combination in the database.

24. A wireless device server comprising:
a wireless device receiver to receive a first set of activation credentials;
a wireless device activator to activate a first wireless device and deactivate a second wireless device when the first set of activation credentials match a reference set of activation credentials;
an activity reporter to detect unauthorized use of the first wireless device by identifying an incorrect first activation code entered at the first wireless device; and
a web server to send an e-mail message indicative of the unauthorized use to the second wireless device in response to identifying the incorrect first activation code.

25. A wireless device server as defined in claim 24 wherein the first set of activation credentials are associated with the first wireless device.

26. A wireless device server as defined in claim 25 wherein the first set of activation credentials comprise a first activation code and a first identifier.

27. A wireless device server as defined in claim 24 wherein the reference set of activation credentials comprise a first activation code and a first identifier.

28. A wireless device server as defined in claim 24 wherein the reference set of credentials is stored in a database.

29. A wireless device server as defined in claim 24 wherein the first and second wireless devices further comprise a keypad to receive activation credentials.

30. A wireless device server as defined in claim 29 wherein the first and second wireless devices further comprise a transmitter to transmit the activation credentials to the wireless device server.

31. A wireless device server as defined in claim 24 further comprising a wireless device locator to locate at least one of the first wireless device or the second wireless device.

32. A wireless device server as defined in claim 31 wherein at least one of the first wireless device or the second wireless device comprise a global positioning satellite receiver.

33. A wireless device server as defined in claim 32 wherein the at least one of the first wireless device or the second wireless device transmit location coordinates to the wireless device locator.

34. A backup wireless device server as defined in claim 24, wherein the activity reporter is invoked in response to a threshold number of incorrect first activation code entries at the first wireless device.

35. A system to control wireless devices comprising:
a device database to receive and store wireless device data;
a wireless device network to facilitate communication between wireless devices and the device database;
a wireless device server to activate a first wireless device and deactivate a second wireless device in response to a first activation code;
an activity reporter to detect unauthorized use of the first wireless device by identifying an incorrect first activation code entered at the first wireless device; and
a web server to send an e-mail message indicative of the unauthorized use and a geographic location of the first wireless device to an account owner of the first wireless device in response to identifying the incorrect first activation code.

36. A system as defined in claim 35 wherein the wireless device server activates the first wireless device in response to receipt of the first activation code from at least one of the first wireless device, a land-line phone, or a user interface.

37. A system as defined in claim 35 further comprising a plurality of backup wireless devices, the wireless device server activating one of the plurality of backup wireless devices in response to receipt of an activation code associated with the one of the plurality of backup wireless devices.

38. A system as defined in claim 35 further comprising a user interface to associate a unique identifier of the first and second wireless devices with a first and second activation code.

39. A system as defined in claim 38 wherein the user interface comprises an Internet accessible web-based interface.

40. An apparatus comprising:
a first wireless device, the first wireless device comprising a first input and a first transmitter;
a second wireless device, the second wireless device comprising a second input and a second transmitter, the first wireless device receiving a first activation code from the first input to activate the first wireless device and deactivate the second wireless device;
an activity reporter to detect unauthorized use of the first wireless device by identifying an incorrect first activation code entered at the first wireless device; and
a web server to send an e-mail message indicative of the unauthorized use and a geographic location of the first wireless device to an account owner of the first wireless device in response to identifying the incorrect first activation code.

41. An apparatus as defined in claim 40 wherein the first and second wireless devices comprise at least one of a wireless phone or a personal digital assistant (PDA).

42. An apparatus as defined in claim 40 wherein the first wireless device is inactive when the second wireless device is active, and the second wireless device is inactive when the first wireless device is active.

43. An apparatus as defined in claim 40 further comprising a server to receive a first activation credential from the first transmitter, the server comparing the first activation credential with a reference credential.

44. An apparatus as defined in claim 43 wherein the first activation credential comprises the first activation code and a first identifier, the first identifier associated with the first wireless device.

45. An apparatus as defined in claim 44 wherein the first identifier is at least one of a unique electronic serial number (ESN) or a unique international mobile equipment identity (IMLI).

46. An apparatus as defined in claim 43 wherein the server activates the first wireless device and deactivates the second wireless device when the first activation credential from the first transmitter matches the reference credential.

47. An apparatus as defined in claim 43 further comprising a database communicatively connected to the server, the database storing the reference credential.

48. An apparatus as defined in claim 43 further comprising a web server communicatively connected to a network, the web server providing a network accessible web page to a user.

49. An apparatus as defined in claim 48 wherein the network comprises at least one of the Internet, an intranet, or a virtual private network.

\* \* \* \* \*

UNITED STATES PATENT AND TRADEMARK OFFICE
CERTIFICATE OF CORRECTION

PATENT NO. : 7,647,041 B2  Page 1 of 1
APPLICATION NO. : 11/393113
DATED : January 12, 2010
INVENTOR(S) : Gonsalves et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 652 days.

Signed and Sealed this

Twenty-eighth Day of December, 2010

David J. Kappos
*Director of the United States Patent and Trademark Office*